J. Flint,
Grinding Saws.
Nº 85,081
Patented Dec. 22, 1868.
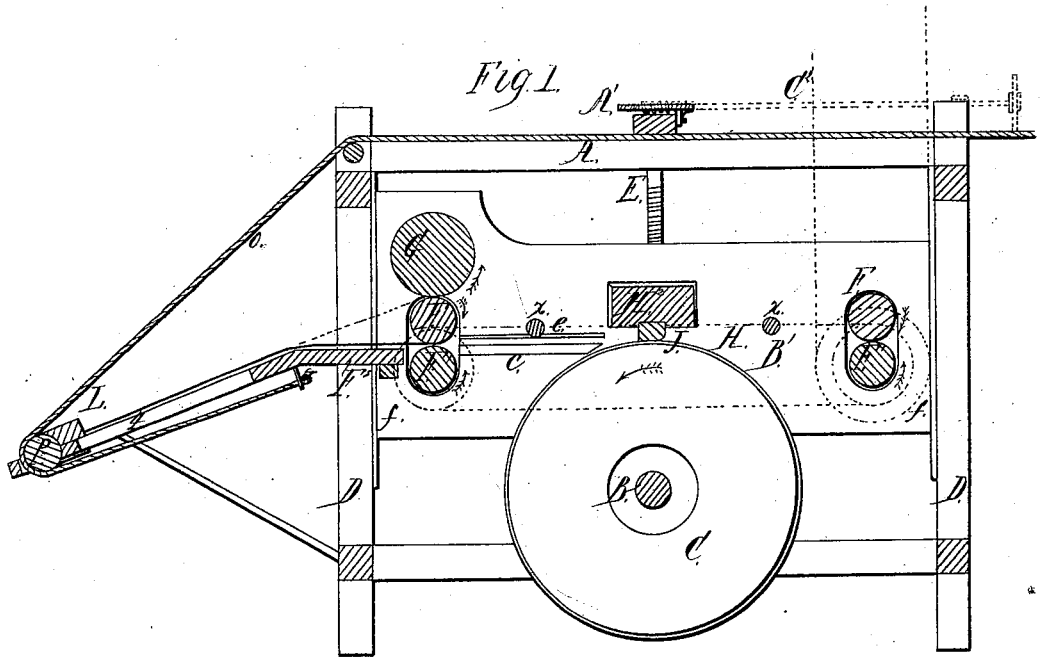
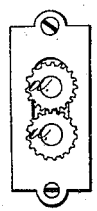
Witnesses:
Inventor:
Joseph Flint

UNITED STATES PATENT OFFICE.

JOSEPH FLINT, OF ROCHESTER, NEW YORK.

Letters Patent No. 85,081, dated December 22, 1868.

IMPROVEMENT IN GRINDING-MACHINES

The Schedule referred to in these Letters Patent and making part of the same.

*To all whom it may concern:*

Be it known that I, JOSEPH FLINT, of the city of Rochester, in the State of New York, have invented a new and useful Saw-Grinding Machine; and I do hereby declare that the following is a full, clear, and exact description thereof, reference being had to the accompanying drawing, making part of this specification, in which—

Figure 1 is a longitudinal section.

Figure 2 is a front elevation of the journal-boxes of the front feed-rollers, and cog-wheels on the shaft of the rollers.

Figure 3 is a front elevation of the journal-boxes of the rear feed-rollers, and cog-wheels on the shaft of the rollers, showing also the end of the shaft of the return-roller.

The nature of my invention will be understood from the drawings and specifications.

To enable others skilled in the art to make and use my invention, I will describe its construction and operation.

On the lower part of a suitable frame, A, I place a shaft, B, which carries a grinding-stone, C.

On the inside of the frame A, a vertically-moving frame, B', is placed, which is sustained by guides, $f$, on the four posts D, forming the frame A; and it is held together by clamping-bolts $x$.

This frame is carried by the regulating-screws E, which are attached, one to each side of the frame A.

Either side of the frame B' may be adjusted by the screws E, so that one will be lower than the other, when it is desired to grind the saw-plate thinner on one edge.

On the screws E, a hand-wheel, A', is keyed, to operate them; or, gear-wheels may be placed on the screw-shafts, instead of the hand-wheel, which mesh into pinions on shafts running to the end of the frame A, shown in dotted lines $C^2$, fig. 1, for the same purpose.

Inside of both ends of the frame B', and in front and rear of the grindstone C, I place two rollers, F and $F^1$, of equal size, for the purpose of feeding and carrying the saw over the top of the stone.

The ends of the shafts of the rollers F extend through the frame B', on one side, and the front roller, $F^1$, has two pulleys on it, as shown in dotted lines, fig. 1.

One of these pulleys is connected to a shaft by a belt, which gives it motion; the other to a pulley on the shaft of the rear roller, $F^1$, by a belt, shown in dotted lines, H, fig. 1, which gives it motion.

The journals of the rollers F and $F^1$ are all fitted in boxes that have rubber or other springs, that allow them to yield, if any unevenness occurs in the saw-plate.

On the ends of the shafts of the front rollers, F and $F^1$, opposite to the pulleys shown in dotted lines, fig. 1, I place cog-wheels, $a$, which mesh into each other, as shown in fig. 2.

I also provide the rear rollers, F and $F^1$, with like cog-wheels, $b$, which mesh into each other, fig. 3.

All the cog-wheels, $a$ and $b$, having the same diameter, give a uniform motion to the rollers F and $F^1$.

On top of the rear rollers, and inside of the frame B', I place a roller, G, the journals of which are fitted in boxes, held together by springs.

This roller is larger than the roller F, so that, a rubber packing being placed between the journal-boxes of these rollers, they will come close together.

Inside of the frame B', and immediately over the grinding-stone C, I place a wood cross-bar, $H^2$, having fitted in its under face a hardened piece of metal, J, to prevent wear by the saw as it passes through.

The cross-bar $H^2$ is intended to press the saw down on the grinding-stone.

Between the grinding-stone C and the rear rollers, F and $F^1$, I place a stationary guiding-platform, $c$, the top of which is a little below the top of the stone, so that the saw will pass over it, into the rear rollers, F and $F^1$.

I place over the guiding-platform $c$ a covering-board, $e$, at a suitable distance to allow for the thickness of the saw-plate.

The cover-board $e$ serves to guide the plate into the rollers F and $F^1$, and it also prevents the saw from kinking or doubling up by the extra speed of the grinding-stone, which forces it faster than the rollers F and $F^1$ are required to take it through.

On the rear end of the frame A, I fasten a platform, $F^3$, slightly below the top of the roller $F^1$; and a part of the plaform is bent downward, until the surface is in a direct line with a point between the rollers F and G.

The inclined part of the platform has a slot, $y$, extending down to the lower end.

On the inclined portion of the platform, I have a slide, L, that is moved up by a rope, $o$, fastened to the upper end of the slot $y$.

This rope $o$ runs over a pulley, P, in the outer end of the slide L, and, over the top of the frame, to the operator.

The slide L is carried down by the saw-plate as it comes out from the rear rollers F and $F^1$.

The object of my invention is to produce a machine that will grind saws more evenly and quickly than can be done by the present means.

Its operation is as follows:

The grinding-stone being set in motion by a belt leading to a pulley on the shaft which carries the stone, the operator places the saw-plate between the front rollers, F and $F^1$, which, being set in motion, carry the saw between the grinding-stone C and cross-bar $H^2$, and, between the guiding-platform $c$ and cover $e$, to the rear rollers, F and $F^1$. The front and rear rollers, F and $F^1$, run at a less speed than the periphery of the grinding-stone C. Consequently the front rollers, F and $F^1$, have to clasp and move the saw-plate gradually over the stone, so that it will be ground; otherwise the stone will carry the saw too fast, and not grind it. The rear rollers, F and F¹, perform the same functions after the saw-plate reaches them, and also guide it along until the outer end of the saw reaches the slide L, which moves down the inclined part of the platform until the saw is clear of the rollers. The inner end of the saw-plate then springs up in a direct line with a point between the rollers G and F, as shown by dotted lines, fig. 1.

The operator, by pulling on the rope o, draws the slide L towards the rollers, and enters the saw-plate between the rollers G and F, and they carry it back to him.

If it is desired to grind the saw thinner on one edge, one side of the frame B' is forced down by the screw E, which presses that side of the saw-plate harder on the stone, and makes it thinner after it is passed through.

What I claim as my invention, and desire to secure by Letters Patent, is—

1. The feed-rollers F and F¹, cross-bar H², in combination with the grinding-stone C, for the purpose herein shown and described.

2. The vertically-movable frame B¹, in combination with the grinding-stone C, as and for the purpose herein set forth.

3. The arrangement of the platform F³, slide L, and rope o, in combination with the rollers G and F, for the purpose of returning the saw to the operator, substantially as herein shown and described.

JOSEPH FLINT.

Witnesses:
  J. C. DIETRICH,
  JAS. LORENZO GAGE.